United States Patent [19]

Gaidis et al.

[11] 4,294,813
[45] Oct. 13, 1981

[54] PROCESS FOR FORMING CALCIUM NITRITE

[75] Inventors: James M. Gaidis, Ellicott City; Arnold M. Rosenberg, Potomac, both of Md.

[73] Assignee: W. R. Grace & Co., New York, N.Y.

[21] Appl. No.: 189,993

[22] Filed: Sep. 23, 1980

[51] Int. Cl.³ .......................... C01B 21/20; C01D 9/00
[52] U.S. Cl. ...................................... 423/385; 423/395
[58] Field of Search ................................ 423/385, 395

[56] References Cited

U.S. PATENT DOCUMENTS

| | | | |
|---|---|---|---|
| 1,013,984 | 1/1912 | Bosch et al. | 423/395 |
| 1,903,815 | 4/1933 | Handforth | 423/385 |
| 2,013,984 | 9/1935 | Gross | 423/395 |
| 2,535,990 | 12/1950 | Stengel | 423/395 |
| 3,928,543 | 12/1975 | Gregory et al. | 423/385 |
| 4,009,246 | 2/1977 | Wendel | 423/385 |
| 4,208,391 | 6/1980 | Endo et al. | 423/385 |

FOREIGN PATENT DOCUMENTS

| | | | |
|---|---|---|---|
| 293495 | 7/1928 | United Kingdom | 423/395 |
| 300632 | 8/1929 | United Kingdom | 423/395 |

OTHER PUBLICATIONS

Chemical Abstracts, vol. 52, No. 8708h.

Primary Examiner—O. R. Vertiz
Assistant Examiner—Wayne A. Langel
Attorney, Agent, or Firm—Philip M. Pippenger

[57] ABSTRACT

Disclosed herein is a process for preparing aqueous solutions of calcium nitrite by forming a solution of sodium nitrite and calcium nitrate; cooling the solution to precipitate sodium nitrate; admixing calcium hydroxide with the residual aqueous phase and forming a double salt of calcium nitrite/calcium hydroxide; and decomposing the double salt in the presence of water to form a solution of calcium nitrite and insolubilize calcium hydroxide.

13 Claims, 1 Drawing Figure

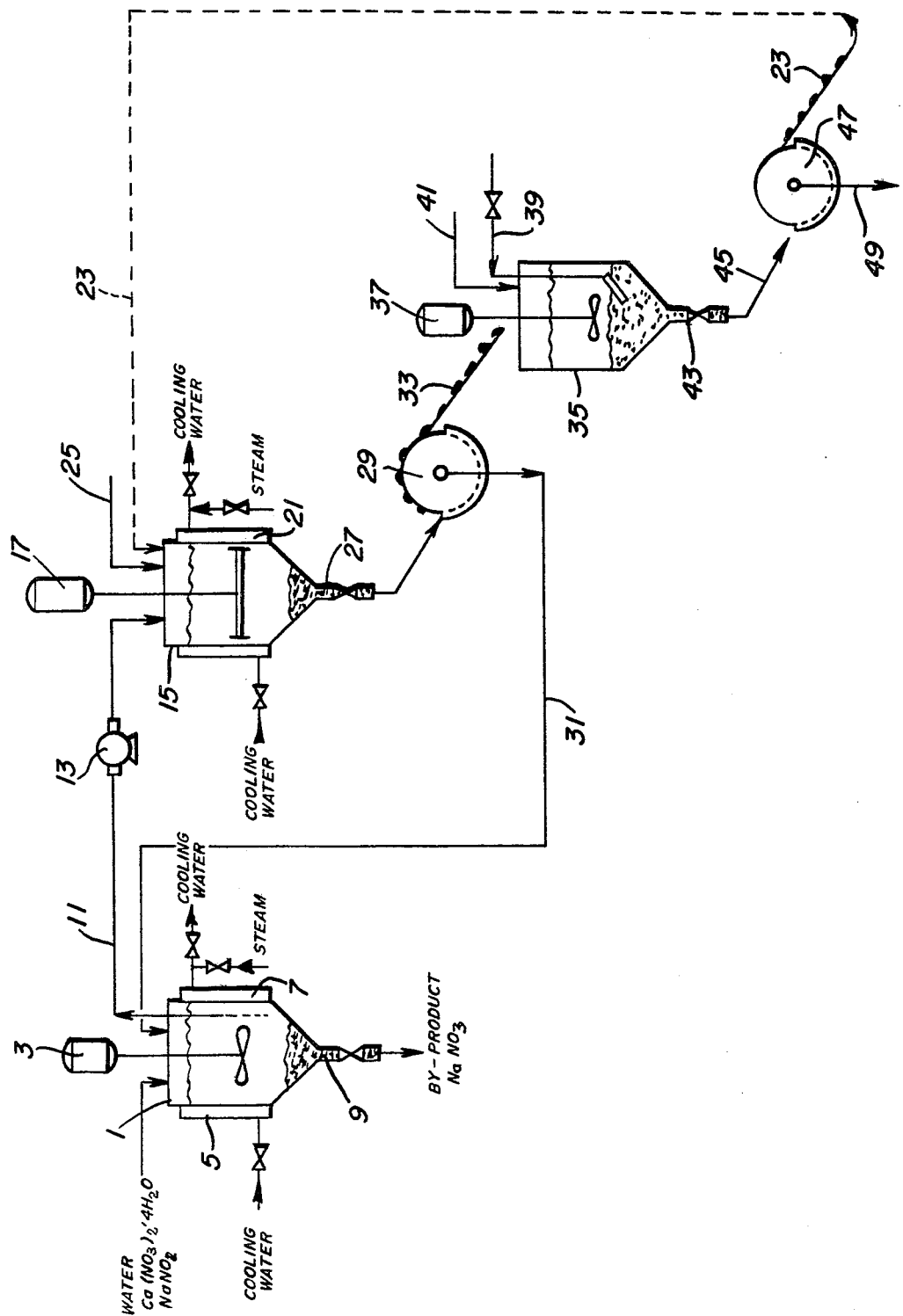

PROCESS FOR FORMING CALCIUM NITRITE

BACKGROUND OF THE INVENTION

Production of aqueous calcium nitrite solutions by absorbing nitrogen oxide gases into a basic calcium hydroxide solution has been known for some time. Such solutions can be employed as additives in cement formulations. Numerous references abstracted in Chemical Abstracts describe the above technology. Specifically, in volume 77, (1972) an article from Ref. Zh., Khim. 1971, describes the use of milk of lime to trap waste gases from production of nitric acid. The abstract in CA77:38609h is similar. In CA85:145344e nitrogen oxide gases are admixed with a slurry of calcium hydroxide to form aqueous solutions of calcium nitrite. A similar process is described in CA85:145345f. In CA84:61959 (Pure Calcium Nitrite), nitrogen oxide gases are absorbed into a calcium hydroxide slurry which is filtered to give a calcium nitrite solution. The abstract of a journal article appearing in *Zh. Neorg. Khim.* 1973, 18(12), 3340-1 (Russ) indicates that anhydrous calcium nitrite is prepared by the reaction of calcium hydroxide with ammonium nitrite followed by heating the crystallohydrates in a vacuum.

The calcium hydroxide/calcium nitrite double salt employed in the invention is also well known. See for example, *Erhitzen im Luftstrom*, F. W. Klingstedt (Acta Acad. Aboenisis 9 Nr.1[1936]1/29). See also L. FERSEN (Zement 24[1935]77/82), and German Pat. No. 649,674 (1936/37) to I. G. Farben.

The U.S. patent literature also discloses various processes wherein nitrogen oxide gases are absorbed into various basic solutions. U.S. Pat. No. 1,471,711 describes absorption into soda and caustic soda solutions to produce aqueous nitrite solutions. U.S. Pat. No. 2,797,144 describes a process for producing ammonium nitrite wherein nitrogen oxide gases with an $NO/NO_2$ molar ratio of at least 4 are contacted with oxygen and ammonium carbonate or ammonium sulfite. In U.S. Pat. No. 3,928,543 nitrogen oxide gases are contacted with aqueous hydroxide solutions (e.g., calcium hydroxide), and the progressive dilution of the nitrogen oxide content of the gas is correlated with the base content of the solution. In U.S. Pat. No. 4,009,246 high temperature gases containing nitrogen oxide are contacted with aqueous solutions of a base (e.g., calcium hydroxide) to rapidly lower the temperature of the gas and produce nitrite salts containing the cation of the base. U.S. Pat. No. 4,045,540 describes production of ammonium nitrite by absorbing gases containing nitrogen oxides into a basic solution containing ammonium cation. Air pollution from residual nitrogen oxide gases is reduced by adding controlled supplemental quantities of $NO_2$ to the absorption system. U.S. Pat. No. 4,053,555 describes a system for scrubbing industrial waste gases containing nitrogen oxides with an aqueous solution to absorb the gases. Subsequently, "desorption" is accomplished to regenerate the initial scrubbing solution, which can be recirculated.

In U.S. Pat. No. 3,965,247 sodium nitrite is recovered from aqueous sodium chloride solutions by crystallization.

DESCRIPTION OF THE INVENTION

The invention is a method for preparing aqueous solutions of calcium nitrite comprising the successive steps of forming a solution of sodium nitrite and calcium nitrate in water. The solution is cooled to insolubilize sodium nitrate, which is separated from the residual aqueous solution of calcium nitrite. Thereafter, calcium hydroxide is admixed with the calcium nitrite solution to form a calcium nitrite/calcium hydroxide double salt. The solution is cooled to insolubilize the double salt, which is then separated. Subsequently, the double salt is dissolved in water to form calcium hydroxide (insoluble) and an aqueous solution of calcium nitrite. The insolubilized calcium hydroxide is separated and can be recycled to form additional amounts of the double salt. Also, the calcium nitrite solution from which the double salt precipitates can be recycled into contact with the initial sodium nitrite/calcium nitrate solution.

The present invention is based upon several unobvious advantages. First, as the initial sodium nitrite/calcium nitrate solution is cooled, it is unexpected that sodium nitrate will precipitate. Also, it is unexpected that substantial precipitation will occur within relatively narrow temperature swings, e.g., 20 to 30 Centigrade degrees. These discoveries therefore provide a convenient method for separating substantial amounts of sodium and nitrate ions from the reaction mixture which contributes significantly to the purity of the final calcium nitrite solution.

Secondly, the invention utilizes formation of a double salt of calcium nitrite with calcium hydroxide. Numerous processes described in the literature attempt to avoid double salt formation. However, the present invention deliberately forms a double salt to provide a second method of separating calcium nitrite from residual impurities which remain in solution. The double salt employed in the present invention is believed to have the formula $Ca(NO_2)_2 \cdot Ca(OH)_2 \cdot 2H_2O$, although, the formula has also been described as $CaO \cdot Ca(OH)_2 \cdot 3H_2O$.

In forming the sodium nitrite/calcium nitrate solution, the $NaNO_2/Ca(NO_3)_2$ ratio is from 1.9 to 2.2, and generally is about 2. The solution is formed by simply dissolving the salts in water or, alternatively, separate solutions of each salt can be formed and the solutions can be admixed. Also, it is possible to form a solution of one of the salts and add the second salt thereto. To provide adequate solubility, the solution is generally formed at a temperature of about 70°–110° C. The aqueous solution is generally concentrated with regard to both salts, although the concentrations on a weight percentage basis can range from 30 to 40 for (anhydrous) calcium nitrate and from 30 to 40 for sodium nitrite.

Following formation, the solution is cooled to a temperature of about 0° to 30° C., and preferably 15°–30° C. As the temperature is lowered, the sodium nitrate will precipitate. It has been noted that calcium nitrite also tends to precipitate to a small degree, especially at temperatures below about 10° C., assuming that a saturated solution is employed.

The insoluble sodium nitrate is separated to provide an aqueous phase enriched in calcium nitrite, although both sodium and nitrate ions remain behind. Generally, the residual concentration in the aqueous phase of sodium nitrate and sodium nitrite, in the form of their respective ions, will be up to 10% for sodium nitrate and up to 8% for sodium nitrite.

As described above, the residual calcium nitrite solution is contacted with calcium hydroxide to form the double salt. The calcium hydroxide is generally employed in the form of slaked lime or equivalents thereof, e.g., burnt lime. Generally the aqueous solution is heated to a temperature of from 50° to 90° C. prior to addition of the calcium hydroxide. It has been discovered at temperatures below about 55° C., formation of a "gel" tends to occur wherein needlelike crystals rapidly form a maze in the solution, which prevents adequate stirring. To obviate gel formation, the solution can be heated or else the calcium hydroxide is added at a higher temperature.

The amount of calcium hydroxide employed depends upon a number of factors. The function of the calcium hydroxide is essentially as a carrier for calcium nitrite, i.e., the calcium hydroxide forms the insolubilized double salt which can be utilized to separate portions of the calcium nitrite from the solution. Thereafter the double salt is dissolved to liberate the calcium nitrite and regenerate the calcium hydroxide. Therefore it is apparent that the amount of calcium hydroxide used should be sufficient to produce the maximum amount of double salt possible, bearing in mind the stoichiometry and temperature equilibriums discussed below. With regard to the formation of the double salt and subsequent dissolution to liberate the calcium nitrite, the reactive stoichiometry is believed to be as follows:

I. Precipitation of Double Salt

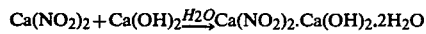

II. Liberation of Calcium Nitrite

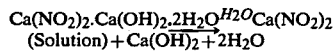

In aqueous solutions wherein both calcium hydroxide and calcium nitrite are present, the calcium nitrite is in equilibrium with the insoluble double salt. For example, at 20° C., and assuming that the solution is saturated with respect to calcium hydroxide and calcium nitrite, the maximum concentration of calcium nitrite in solution will be 20 weight percent, with the remainder tied up as the insoluble double salt. At 30° C. the maximum is 22.5%. Above about 55° C. double salt formation fails to occur, i.e., the formation of the double salt must proceed at less than about 55° C. The calcium hydroxide is added in an amount sufficient to form as much of the double salt as possible. For example, at 20° C., if the calcium nitrite solution has a concentration of 35%, enough calcium hydroxide is added to convert 3/7 of the calcium nitrite to the double salt. This will reduce the concentration of calcium nitrite to 20%, with the remainder as double salt based on the equilibrium discussed above and the stoichiometry of equation one. If excess calcium hydroxide is added, it will not result in formation of more double salt. If insufficient calcium hydroxide is added, the amount of double salt formed will not be maximized and detracts from the efficiency of the process. For any given temperature within the range of 0° C. to 55° C., the equilibrium between the double salt and calcium nitrite can easily be determined by cooling a solution saturated with respect to calcium hydroxide and calcium nitrite but containing excess calcium nitrite to the desired temperature and measuring the amounts of double salt formed and the amount of calcium nitrite remaining in solution. The amount of calcium hydroxide can then be adjusted accordingly.

Following formation, the double salt is separated from the aqueous phase and dissolved in water to produce a solution of calcium nitrite and precipitate calcium hydroxide. The concentration of calcium nitrite is determined according to the stoichiometry of equation II above. However, the temperature of the solution must be sufficient to dissolve all of the double salt so that the equilibrium discussed above does not interfere. Conveniently, solutions can be prepared with calcium nitrite concentrations of 20-35%, and preferably 27-35%, by weight. Presently, solutions of 30% by weight are sold for use as corrosion inhibitors in concrete formulations.

The precipitate calcium hydroxide can be separated and reused to form more of the double salt. The amount of impurities in solutions produced by the invention measured as sodium nitrite and sodium nitrate will generally not exceed 8% by weight sodium nitrate and 4% by weight sodium nitrite.

The process of the invention can be carried out on a batch or continuous basis. While FIG. 1 and the following discussion envision a batch process, as will be recognized by those skilled in this art the process could also be carried out on a continuous basis. In FIG. 1 (a schematic diagram of the batch process of the invention), an aqueous solution of calcium nitrite is conveyed into mixing tank 1 fitted with stirring apparatus 3, cooling means 5 and heating means 7. As discussed above, the aqueous solution is cooled in mixing tank 1 to a temperature of from about 15° to 30° C., thereby causing by-product sodium nitrate to precipitate and exit through the bottom of mixing tank 1 through conduit 9. The heating means 7 is employed to form the initial calcium nitrate/sodium nitrite solution in mixing tank 1. In forming the solution, stirring apparatus 3 is also employed to disperse the salts.

Following precipitation of the sodium nitrate, the enriched calcium nitrite solution is withdrawn from mixing tank 1 through conduit 11 utilizing pump 13 and deposited in tank 15 equipped with stirring means 17, cooling elements 19 and heating means 21. Recycled calcium hydroxide is introduced through conduit 23 into tank 15. Any "make-up" calcium hydroxide necessary to achieve the desired concentration as described above enters through conduit 25. The initial temperature of tank 15 during addition of calcium hydroxide is from about 60° to 80° C. Thereafter, cooling elements 19 (e.g., cooling-water conduits) are activated to lower the temperature of the calcium hydroxide/calcium nitrite admixture to the desired level, causing precipitation of the double salt which is removed along with the calcium nitrite solution from tank 15 through conduit 27 onto rotary filter 29. Residual calcium nitrite solution emanating from rotary filter 29 is returned through conduit 31 to tank 1. The filtered double salt from rotary filter 29 is conveyed through line 33 to tank 35 fitted with stirring means 37 and heating means (e.g., steam sparger) 39 and conduit 41. Water enters tank 35 through conduit 41 and is heated to a temperature of from 50° to 90° C. (e.g., 80° C.) to solubilize the double salt and precipitate calcium hydroxide. The product slurry containing precipitated calcium hydroxide passes from tank 35 through conduit 43 and line 45 onto a rotary filter 47 where product calcium nitrite solution is separated and flows to storage through line 49, and solid calcium hydroxide is recycled to tank 15 through line 23.

In the following examples, all percentages are by weight based on the total weight of the solution, slurry, etc., unless otherwise stated.

EXAMPLE 1

100 g of $NaNO_2$ was admixed with a solution of $Ca(NO_3)_2$ (171 g of tetrahydrate in 36 g $H_2O$). The combined solutions had a temperature of about 100° C. and were cooled to a temperature of about 20° C. to precipitate $NaNO_3$. 96.5 grams of the $NaNO_3$ were collected. The mother liquor was heated to 75° C., and 42 grams of Ca(OH) were added thereto. The admixture was cooled to 25° C. to form 209 grams (147.6 g THEORETICAL) of a double salt having the general formula $Ca(NO_2)_2 \cdot Ca(OH)_2 \cdot 2H_2O$. The precise formula for the double salt may vary, especially in the amount of hydrated water. For purposes of the present invention, it is important only that the $Ca(OH)_2$ combine with the $Ca(NO_2)_2$ in solution to form an insoluble salt which can be precipitated, thereby affording a means for separating the $Ca(NO_2)_2$ from the sodium and nitrate ions contributed by the starting materials.

209 grams of the double salt were washed with 100 grams of water at a temperature of 20° C., and the washed double salt (143.6 g) was dissolved in 72 g $H_2O$ at 75° C., releasing the $Ca(OH)_2$ and producing 124 g of a $Ca(NO_2)_2$ solution having a 31.4% concentration.

What is claimed is:

1. A method for preparing aqueous solutions of calcium nitrite comprising the successive steps of:
   (a) forming a solution of $NaNO_2$ and $Ca(NO_3)_2$ in water;
   (b) cooling said solution to insolubilize $NaNO_3$ and form an aqueous solution of calcium nitrite;
   (c) separating the insoluble $NaNO_3$ from the aqueous calcium nitrite solution;
   (d) admixing calcium hydroxide with said aqueous calcium nitrite solution;
   (e) forming a water-insoluble calcium nitrite/calcium hydroxide double salt and separating said double salt from the aqueous phase;
   (f) decomposing the double salt in the presence of water to form insoluble calcium hydroxide and yield an aqueous solution of calcium nitrite; and
   (g) separating the aqueous calcium nitrite solution from the insoluble calcium hydroxide.

2. A process as in claim 1 including the step of recycling the aqueous phase formed in step (e) back to step (a).

3. A process as in claim 1 including the step of recycling the calcium hydroxide formed in step (f) back to step (d) to be utilized as all or part of the calcium hydroxide employed in said step (d).

4. A process as in claim 1 where in step (a) the molar $NaNO_2/Ca(NO_3)_2$ ratio is from 1.9 to 2.2.

5. A process as in claim 1 wherein the temperature of the solution formed in step (a) is from 70° to 110° C.

6. A process as in claim 1 where the aqueous solution of calcium nitrite formed in step (f) has a concentration of from 20 to 35 weight percent.

7. A process as in claim 6 wherein the solution concentration is from 27 to 35 weight percent of calcium nitrite.

8. A process as in claim 1 wherein steps (a)–(g) are carried out on a batch basis.

9. A process as in claim 1 wherein steps (a)–(g) are carried out on a continuous basis.

10. A process as in claim 1 where in step (f) the aqueous phase is maintained at a temperature of from 20° to 50° C. to form insoluble calcium hydroxide.

11. A process as in claim 1 where in step (b) the aqueous solution is cooled to a temperature of from about 0° to 30° C. to precipitate sodium nitrate.

12. A method for preparing aqueous solutions of calcium nitrite comprising the successive steps of:
    (a) forming an aqueous solution of sodium nitrite and calcium nitrate;
    (b) cooling said solution to insolubilize sodium nitrate and form an aqueous solution of calcium nitrite; and
    (c) separating the aqueous calcium nitrite solution from the insoluble sodium nitrate.

13. A process as in claim 12 where the solution of step (b) is maintained at a temperature of from about 0° to 30° C. to precipitate sodium nitrate.

* * * * *